US012766625B2

(12) United States Patent
Massey, Jr. et al.

(10) Patent No.: US 12,766,625 B2
(45) Date of Patent: Oct. 20, 2026

(54) SYSTEMS AND METHODS TO START A WELDING PROCESS

(71) Applicant: Illinois Tool Works Inc., Glenview, IL (US)

(72) Inventors: Steven Blair Massey, Jr., Appleton, WI (US); James Lee Uecker, Appleton, WI (US)

(73) Assignee: Illinois Tool Works Inc.

( * ) Notice: Subject to any disclaimer, the term of this patent is extended or adjusted under 35 U.S.C. 154(b) by 1141 days.

(21) Appl. No.: 17/741,586

(22) Filed: May 11, 2022

(65) Prior Publication Data

US 2022/0362875 A1 Nov. 17, 2022

Related U.S. Application Data

(60) Provisional application No. 63/187,720, filed on May 12, 2021.

(51) Int. Cl.
*B23K 9/12* (2006.01)
*B23K 9/067* (2006.01)
*B23K 9/095* (2006.01)

(52) U.S. Cl.
CPC .............. *B23K 9/125* (2013.01); *B23K 9/067* (2013.01); *B23K 9/0953* (2013.01); *B23K 9/0956* (2013.01)

(58) Field of Classification Search
CPC ...... B23K 9/125; B23K 9/067; B23K 9/0953; B23K 9/0956
USPC ..................................................... 219/137.71
See application file for complete search history.

(56) References Cited

U.S. PATENT DOCUMENTS

2015/0273614 A1* 10/2015 Raudsepp .............. B23K 9/073 219/73
2017/0165778 A1* 6/2017 Hsu ...................... B23K 9/1093
2018/0333798 A1* 11/2018 Uecker ................ B23K 9/1093
2018/0354051 A1* 12/2018 Uecker .................. B23K 9/173

OTHER PUBLICATIONS

European Office Communication with extended European Search Report Appln No. 22172878.5 dated Dec. 5, 2022.
European Office Communication with extended European Search Report Appln No. 22172878.5 dated Nov. 24, 2022.

* cited by examiner

*Primary Examiner* — Steven W Crabb
*Assistant Examiner* — Alba T Rosario-Aponte
(74) *Attorney, Agent, or Firm* — MCANDREWS HELD & MALLOY LTD.

(57) ABSTRACT

An example welding system includes: a welding power supply configured to convert input power to welding power; a wire feeder configured to feed welding wire to a welding torch; and control circuitry configured to: in response to an initiation of a welding process, control the wire feeder to feed the welding wire at a first rate while controlling the welding power supply to output the welding power to initiate a welding arc; in response to initiation of the welding arc, control the wire feeder to increase a feed rate of the wire feeder from the first rate to a second rate; and in response to determining that a temperature profile of a heated portion of the welding wire has stabilized, control the wire feeder to change the feed rate of the wire feeder from the second rate to a target wire feed speed.

19 Claims, 5 Drawing Sheets

SYSTEMS AND METHODS TO START A WELDING PROCESS

RELATED APPLICATIONS

The present application claims the benefit of U.S. Provisional Patent Application Ser. No. 63/187,720, filed May 12, 2021, entitled "SYSTEMS AND METHODS TO START A WELDING PROCESS." The entirety of U.S. Provisional Patent Application Ser. No. 63/187,720 is expressly incorporated herein by reference.

BACKGROUND

This disclosure relates generally to welding processes involving preheating wire and, more particularly, to systems and methods to start a welding process.

Welding is a process that has increasingly become ubiquitous in all industries. Welding is, at its core, simply a way of bonding two pieces of metal. A wide range of welding systems and welding control regimes have been implemented for various purposes. In continuous welding operations, metal inert gas (MIG) welding and submerged arc welding (SAW) techniques allow for formation of a continuing weld bead by feeding welding electrode wire shielded by inert gas from a welding torch and/or by flux. Such wire feeding systems are available for other welding systems, such as tungsten inert gas (TIG) welding. Electrical power is applied to the welding wire and a circuit is completed through the workpiece to sustain a welding arc that melts the electrode wire and the workpiece to form the desired weld.

SUMMARY

Systems and methods to start a welding process are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1A:
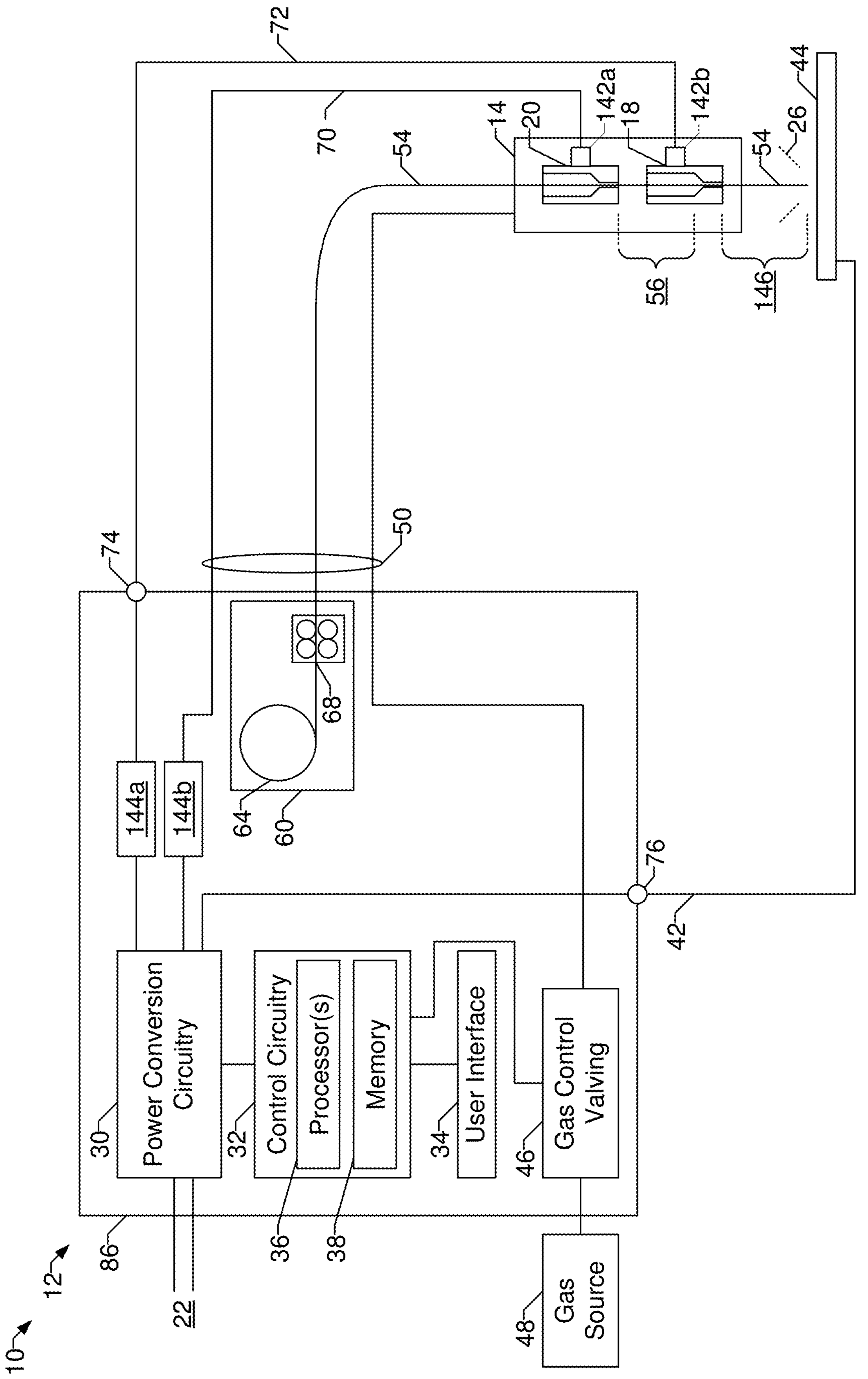
FIG. 1A illustrates an example welding system including a welding power supply configured to convert input power to welding power and preheating power, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

In conventional welding systems involving preheating, the welding process may be configured to operate at relatively high wire feed speeds (WFS) than non-preheating welding processes. In some cases, operation could involve wire feed speeds as much as 1000 inches per minute (ipm), and are often between 600 and 800 ipm. Such high operating wire feed speeds present challenges during the arc starting transient, in which initial wire feed speeds are typically 50-100 ipm, and then accelerate (e.g., ramp up) to the operating wire feed speed (e.g., over a few hundred milliseconds). In conventional weld processes, start conditions are typically variable and defined based on the wire feed speed parameter specified by the user. During the arc starting transient, the wire feed speed is accelerating, and the wire temperature profile is changing. Depending on the rate of the arc starting transient, the arc current can reach the maximum output of the welding machine and can cause the electrode extension to break and eject a large chunk of wire, cause excessive spatter, and/or cause the arc to be extinguished. The arc could also be extinguished from a short circuit in the event that the arc current is not sufficient to maintain the arc length.

Disclosed example systems and methods mitigates the foregoing problems by reducing variability in arc starting conditions, and reducing or eliminating the need to define and test arc start conditions across a wire feed speed range. executing the arc start using a predetermined, intermediate wire feed speed, which could be constant between welding operations having different wire feed speed setpoints, and then ramping to the user-defined target wire feed speed. The predetermined, intermediate wire feed speed may be a chosen wire feed speed (or wire feed rate) that is between the initial wire feed speed at arc initiation and the target wire feed speed. As a result, disclosed example systems and methods provide a consistent arc starting period that establishes the arc and controls the wire feed speed ramp duration and arc current to provide for a stabilized wire temperature profile prior to reaching the target wire feed speed. Stabilizing the wire temperature profile avoids the hot spot in the wire that results in ejection of a large chunk of wire, reduces or eliminates spatter, and avoids extinguishing of the arc. During the portion of the arc start that is the same every time, the ramp duration and arc current response are controlled to allow the wire temperature profile, and therefore the process output, to stabilize before ramping to the user defined WFS setting while mitigating the adverse situations described. Disclosed example systems and methods may also limit the arc current variation and fluctuations in arc length which can generate spatter, fume, undesirable weld bead profile, or burn-through.

As used herein, a temperature profile of a wire is considered "stable" or "stabilized" when the temperature gradients within the portion of the wire are less than a predetermined threshold.

Some example systems and methods monitor for wire temperature stabilization in the stickout portion of the wire (e.g., the portion of the wire located between the arc and the contact tip providing the welding current, which is heated by resistive, or Joule, heating) by monitoring the welding current for one or more conditions. In some examples, when the welding current reaches a local minimum after increasing the wire feed speed to the intermediate rate, disclosed systems and methods determine that the wire temperature profile has stabilized, and controls the welding process to ramp up to the target wire feed speed and conclude the arc starting procedure.

In some examples, the current is considered to reach a local minimum upon decreasing from a first current to a second current, and then increasing from the second current for at least a threshold time without decreasing below the second current again.

Other disclosed example systems and methods using a calibrated time-based approach for stabilizing the wire temperature. For example, by holding the intermediate wire feed speed for at least a calibrated threshold time period, the wire temperature profile may be considered to be stabilized. The threshold time period may be calibrated and/or determined based on wire type, wire size, elapsed time since the most recent welding operation, and/or the presence of any preheating of the wire prior to the stickout portion.

By controlling the duration of the start ramp for wire feed speed and/or wire preheating, excessive levels of arc current can be prevented during the arc starting operation. For example, when a user chooses a higher wire fees speed, a larger amount of current is required to achieve the target arc voltage, which could cause burn through during the arc starting process on some relatively thinner materials. When the wire is colder at the beginning of the arc starting process, even more current is required.

In some examples, disclosed systems and methods have a rapid current response of the welding power source during the transient portion of the arc start to accommodate rapidly changing conditions, and then have a slower current response during the steady state portion of the process (e.g., after the arc initiation) to help improve process stability. While example systems and methods disclosed herein include preheating of the wire, which may affect wire temperature stabilization time, other example systems and methods may omit or disable the wire preheating. In some examples, the wire preheating may be engaged prior to arc starting to pre-condition the wire to a higher temperature during the arc starting process.

The terms "wire feed speed" and "wire feed rate" are used interchangeably throughout this disclosure.

As utilized herein the terms "circuits" and "circuitry" refer to physical electronic components (i.e. hardware) and any software and/or firmware (code) that may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a wire-fed welding-type system refers to a system capable of performing welding (e.g., gas metal arc welding (GMAW), gas tungsten arc welding (GTAW), submerged arc welding (SAW), etc.), brazing, cladding, hardfacing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, induction heating, laser (including laser welding, laser cladding, and/or laser additive manufacturing), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith. The terms "power source" and "power supply" are used interchangeably herein.

As used herein, preheating refers to heating the electrode wire prior to a welding arc and/or deposition in the travel path of the electrode wire.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

Disclosed example welding systems include: a welding power supply configured to convert input power to welding power; a wire feeder configured to feed welding wire to a welding torch; and control circuitry configured to: in response to an initiation of a welding process, control the wire feeder to feed the welding wire at a first rate while controlling the welding power supply to output the welding power to initiate a welding arc; in response to initiation of the welding arc, control the wire feeder to increase a feed rate of the wire feeder from the first rate to a second rate; and in response to determining that a temperature profile of a heated portion of the welding wire has stabilized, control the wire feeder to change the feed rate of the wire feeder from the second rate to a target wire feed speed.

In some example welding systems, the control circuitry is configured to: monitor a welding current of the welding power; and determine that the temperature profile of the heated portion has stabilized in response to the welding current reaching a local minimum. In some example welding systems, the control circuitry is configured to determine that the temperature profile of the heated portion has stabilized in response to the wire feeder outputting the welding wire at the second rate for at least a threshold time. Some example welding systems further include a preheating power supply configured to output preheating power to preheat a portion of the welding wire located prior to a stickout portion along a travel path of the welding wire, wherein the control circuitry is configured to set the threshold time based on the preheating power.

In some example welding systems, the second rate is based on a diameter of the welding wire. In some example welding systems, the second rate is between 200 inches per minute and 600 inches per minute. In some such welding systems, the second rate is between 400 inches per minute and 600 inches per minute. In some example welding systems, the target wire feed speed is more than 500 inches per minute. In some such welding systems, the target wire feed speed is more than 600 inches per minute.

In some example welding systems, the control circuitry is configured to, after initiation of the welding arc but prior to increasing the feed rate of the wire feeder from the first rate to the second rate: control a welding current of the welding power based on a first target current; and increase the welding current from the first target current to increase an arc length of the welding arc to a target length. In some example welding systems, the control circuitry is configured to change to a voltage-controlled control mode when increasing the feed rate from the first rate after increasing the welding current from the first target current. In some example welding systems, the control circuitry is configured to determine that the arc length has met the target length based on a voltage of the welding power.

In some examples, the heated portion of the welding wire is a stickout portion of the welding wire between a welding contact tip and the arc. In some example welding systems, the target wire feed speed is higher than the second rate.

Some disclosed example welding systems include: a welding power supply configured to convert input power to welding power; a wire feeder configured to feed welding wire to a welding torch; and control circuitry configured to: in response to an initiation of a welding process, control the wire feeder to feed the welding wire at a first rate while controlling the welding power supply to output the welding power to initiate a welding arc; in response to initiation of the welding arc, control the wire feeder to increase a feed rate of the wire feeder from the first rate to a second rate; monitor a welding current of the welding power; and in response to determining that the welding current has reached a local minimum, control the wire feeder to change the feed rate of the wire feeder from the second rate to a target wire feed speed.

FIG. 1A illustrates an example welding system 10, including a welding power supply 12 configured to convert input power to welding power and preheating power. The example welding system 10 of FIG. 1A includes the welding power supply 12 and a preheating welding torch 14. The welding torch 14 may be a torch configured for any wire-fed welding process, such as gas metal arc welding (GMAW), flux cored arc welding (FCAW), self-shielded FCAW, and/or submerged arc welding (SAW), based on the desired welding application.

The welding power supply 12 converts the input power from a source of primary power 22 to one or both of output welding power and/or preheating power, which are output to the welding torch 14. In the example of FIG. 1A, the welding power source also supplies the filler metal to a welding torch 14 configured for GMAW welding, FCAW welding, or SAW welding.

The welding power supply 12 is coupled to, or includes, the source of primary power 22, such as an electrical grid or engine-driven generator that supplies primary power, which may be single-phase or three-phase AC power. For example, the welding power supply 12 may be an engine-driven welding power source that includes the engine and generator that provides the primary power 22 within the welding power supply 12. The welding power supply 12 may process the primary power 22 to output welding-type power for output to the welding torch 14 via a torch cable 50.

Power conversion circuitry 30 converts the primary power (e.g., AC power) to welding-type power as either direct current (DC) or AC, and to preheating power. Example preheating power may include DC and/or AC electrical current that provides resistive, or Joule, heating when conducted through a portion of the electrode wire 54. Additional examples of preheating power disclosed herein may include high frequency AC current that provides inductive heating within the electrode wire 54, and/or power suitable for hotwire techniques, arc-based preheating in which an electrical arc is used to apply heat to the wire prior to the welding arc, laser-based preheating, radiant heating, convective heating, and/or any other forms of wire heating. The power conversion circuitry 30 may include circuit elements such as transformers, switches, boost converters, inverters, buck converters, half-bridge converters, full-bridge converters, forward converters, flyback converters, an internal bus, bus capacitor, voltage and current sensors, and/or any other topologies and/or circuitry to convert the input power to the welding power and the preheating power, and to output the welding power and the preheating power to the torch 14. Example implementations of the power conversion circuitry 30 are disclosed below in more detail.

The first and second portions of the input power may be divided by time (e.g., the first portion is used at a first time and the second portion is used at a second time) and/or as portions of the total delivered power at a given time. The power conversion circuitry 30 outputs the welding power to a weld circuit, and outputs the preheating power to a preheating circuit or other preheater. The weld circuit and the preheating circuit may be implemented using any combination of the welding torch 14, a weld accessory, and/or the power supply 12.

The power conversion circuitry 30 may include circuit elements such as boost converters. In some examples, the primary power 22 received by the power conversion circuitry 30 is an AC voltage between approximately 110V and 575V, between approximately 110V and 480V, or between approximately 110V and 240V. As used in reference to the input power, the term approximately may mean within 5 volts or within 10 percent of the desired voltage.

The power conversion circuitry 30 may be configured to convert the input power to any conventional and/or future welding-type output. The example power conversion circuitry 30 may implement one or more controlled voltage control loop(s), one or more controlled current control loop(s), one or more controlled power control loops, one or more controlled enthalpy control loops, and/or one or more controlled resistance control loops to control the voltage and/or current output to the welding circuit and/or to the preheating circuit. As described in more detail below, the power conversion circuitry 30 may be implemented using one or more converter circuits, such as multiple converter circuits in which each of the welding-type output and the preheating output is produced using separate ones of the converter circuits.

In some examples, the power conversion circuitry 30 is configured to convert the input power to a controlled waveform welding output, such as a pulsed welding process or a short circuit welding process (e.g., regulated metal deposition (RMD™)). For example, the RMD™ welding process utilizes a controlled waveform welding output having a current waveform that varies at specific points in time over a short circuit cycle.

The welding power supply 12 includes control circuitry 32 and an user interface 34. The control circuitry 32 controls the operations of the welding power supply 12 and may receive input from the user interface 34 through which an operator may choose a welding process (e.g., GMAW, FCAW, SAW) and input desired parameters of the input power (e.g., voltages, currents, particular pulsed or non-pulsed welding regimes, and so forth). The control circuitry 32 may be configured to receive and process a plurality of inputs regarding the performance and demands of the system 10.

The control circuitry 32 includes one or more controller(s) and/or processor(s) 36 that controls the operations of the power supply 12. The control circuitry 32 receives and processes multiple inputs associated with the performance and demands of the system. The processor(s) 36 may include one or more microprocessors, such as one or more "general-purpose" microprocessors, one or more special-purpose microprocessors and/or ASICS, one or more microcontrollers, and/or any other type of processing and/or logic device. For example, the control circuitry 32 may include one or more digital signal processors (DSPs). The control circuitry 32 may include circuitry such as relay circuitry, voltage and current sensing circuitry, power storage circuitry, and/or other circuitry, and is configured to sense the primary power 22 received by the power supply 12.

The example control circuitry 32 includes one or more memory device(s) 38. The memory device(s) 38 may include volatile and/or nonvolatile memory and/or storage devices, such as random access memory (RAM), read only memory (ROM), flash memory, hard drives, solid state storage, and/or any other suitable optical, magnetic, and/or solid-state storage mediums. The memory device(s) 38 store data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth. The memory device 38 may store machine executable instructions (e.g., firmware or software) for execution by the processor(s) 36. Additionally or alternatively, one or more control schemes for various welding processes, along with associated settings and parameters, may be stored in the memory device(s) 38, along with machine executable instructions configured to provide a specific output (e.g., initiate wire feed, enable gas flow, capture welding current data, detect short circuit parameters, determine amount of spatter) during operation.

The example user interface 34 enables control or adjustment of parameters of the welding system 10. The user interface 34 is coupled to the control circuitry 32 for operator selection and adjustment of the welding process (e.g., pulsed, short-circuit, FCAW) through selection of the wire size, wire type, material, and gas parameters. The user interface 34 is coupled to the control circuitry 32 for control of the voltage, amperage, power, enthalpy, resistance, wire feed speed, and arc length for a welding application. The user interface 34 may receive inputs using any input device, such as via a keypad, keyboard, buttons, touch screen, voice activation system, wireless device, etc.

The user interface 34 may receive inputs specifying wire material (e.g., steel, aluminum), wire type (e.g., solid, cored), wire diameter, gas type, and/or any other parameters. Upon receiving the input, the control circuitry 32 determines the welding output for the welding application. For example, the control circuitry 32 may determine weld voltage, weld current, wire feed speed, inductance, weld pulse width, relative pulse amplitude, wave shape, preheating voltage, preheating current, preheating pulse, preheating resistance, preheating energy input, and/or any other welding and/or preheating parameters for a welding process based at least in part on the input received through the user interface 34.

In some examples, the welding power supply 12 may include polarity reversing circuitry. Polarity reversing circuitry reverses the polarity of the output welding-type power when directed by the control circuitry 32. For example, some welding processes, such as TIG welding, may enable a desired weld when the electrode has a negative polarity, known as DC electrode negative (DCEN). Other welding processes, such as stick or GMAW welding, may enable a desired weld when the electrode has a positive polarity, known as DC electrode positive (DCEP). When switching between a TIG welding process and a GMAW welding process, the polarity reversing circuitry may be configured to reverse the polarity from DCEN to DCEP.

Additionally or alternatively, the operator may simply connect the torch 14 to the power supply 12 without knowledge of the polarity, such as when the torch is located a substantial distance from the power supply 12. The control circuitry 32 may direct the polarity reversing circuitry to reverse the polarity in response to signals received through communications circuitry, and/or based on a selected or determined welding process.

In some examples, the power supply 12 includes communications circuitry. For example, communications circuitry may be configured to communicate with the welding torch 14, accessories, and/or other device(s) coupled to power cables and/or a communications port. The communications circuitry sends and receives command and/or feedback signals over welding power cables used to supply the welding-type power. Additionally or alternatively, the communications circuitry may communicate wirelessly with the welding torch 14 and/or other device(s).

For some welding processes (e.g., GMAW), a shielding gas is utilized during welding. In the example of FIG. 1A, the welding power supply 12 includes one or more gas control valves 46 configured to control a gas flow from a gas source 48. The control circuitry 32 controls the gas control valves 46. The welding power supply 12 may be coupled to one or multiple gas sources 48 because, for example, some welding processes may utilize different shielding gases than others. In some examples, the welding power supply 12 is configured to supply the gas with the welding power and/or the preheating power to the torch 14 via a combined torch cable 50. In other examples, the gas control valves 46 and gas source 48 may be separate from the welding power supply 12. For example, the gas control valves 46 may be disposed connected to the combined torch cable 50 via a connector.

The example power supply 12 includes a wire feed assembly 60 that supplies electrode wire 54 to the welding torch 14 for the welding operation. The wire feed assembly 60 includes elements such as a wire spool 64 and a wire feed drive configured to power drive rolls 68. The wire feed assembly 60 feeds the electrode wire 54 to the welding torch 14 along the torch cable 50. The welding output may be supplied through the torch cable 50 coupled to the welding torch 14 and/or the work cable 42 coupled to the workpiece 44. As disclosed in more detail below, the preheating output may be supplied to the welding torch 14 (or another via a connection in the wire feed assembly 60), supplied to the welding torch 14 via one or more preheating power terminals, and/or supplied to a preheater within the wire feed assembly 60 or otherwise within a housing 86 of the welding power supply 12.

The example power supply 12 is coupled to a preheating GMAW torch 14 configured to supply the gas, electrode wire 54, and electrical power to the welding application. As discussed in more detail below, the welding power supply 12 is configured to receive input power, convert a first portion of the input power to welding power and output the welding power to a weld circuit, and to convert a second portion of the input power to preheating power and output the preheating power to a preheating circuit or other preheater.

The example torch 14 includes a first contact tip 18 and a second contact tip 20. The electrode wire 54 is fed from the wire feed assembly 60 to the torch 14 and through the contact tips 18, 20, to produce a welding arc 26 between the electrode wire 54 and the workpiece 44. The preheating circuit includes the first contact tip 18, the second contact tip 20, and a section 56 of the electrode wire 54 that is located between the first contact tip 18 and a second contact tip 20. The example power supply 12 is further coupled to the work cable 42 that is coupled to the workpiece 44.

In operation, the electrode wire 54 passes through the second contact tip 20 and the first contact tip 18, between which the power conversion circuitry 30 outputs a preheating current to heat the electrode wire 54. Specifically, in the configuration shown in FIG. 1A, the preheating current enters the electrode wire 54 via the second contact tip 20 and exits via the first contact tip 18. However, the preheating current may be conducted in the opposite direction, using AC, and/or a combination of AC and DC. At the first contact tip 18, a welding current may also enter (or exit) the electrode wire 54.

The welding current is output by the power conversion circuitry 30, which derives the preheating power and the welding power from the primary power 22. The welding current flows between the electrode wire 54 and the workpiece 44, which in turn generates the welding arc 26. When the electrode wire 54 makes contact with the workpiece 44, or when an arc exists between the electrode wire 54 and the workpiece 44, an electrical circuit is completed and the welding current flows through the electrode wire 54, across the arc 26, across the metal work piece(s) 44, and returns to the power conversion circuitry 30 via a work cable 42. The welding current causes the electrode wire 54 and the parent metal of the work piece(s) 44 to melt, thereby joining the work pieces as the melt solidifies. By preheating the electrode wire 54, the welding arc 26 may be generated with drastically reduced arc energy. Generally speaking, the preheating current is proportional to the distance between the contact tips 18, 20 and the electrode wire 54 size.

During operation, the power conversion circuitry 30 establishes a preheating circuit to conduct preheating current through a section 56 of the electrode wire 54. The preheating current flows from the power conversion circuitry 30 to the second contact tip 20 via a first conductor 70, through the section 56 of the electrode wire 54 to the first contact tip 18, and returns to the power conversion circuitry 30 via a second conductor 72 connecting the power conversion circuitry 30 to the first contact tip 18. Either, both, or neither of the conductors 70, 72 may be combined with other cables and/or conduits. For example, the conductor 70 and/or the conductor 72 may be part of the cable 50. In other examples, the conductor 72 is included within the cable 50, and the conductor 70 is routed separately to the torch 14. To this end, the power supply 12 may include between one and three terminals to which one or more cables can be physically connected to establish the preheating, welding, and work connections. For example, multiple connections can be implemented into a single terminal using appropriate insulation between different connections.

In the illustrated example of FIG. 1A, the power supply 12 includes two terminals 74, 76 configured to output the welding power to the contact tip 20 and the work cable 42. The conductor 72 couples the terminal 74 to the torch 14, which provides the power from the conductor 72 to the contact tip 18. The work cable 42 couples the terminal 76 to the workpiece 44. The example terminals 74, 76 may have designated polarities, or may have reversible polarities.

Because the preheating current path is superimposed with the welding current path over the connection between the first contact tip 18 and the power conversion circuitry 30 (e.g., via conductor 72), the cable 50 may enable a more cost-effective single connection between the first contact tip 18 and the power conversion circuitry 30 (e.g., a single cable) than providing separate connections for the welding current to the first contact tip 18 and for the preheating current to the first contact tip 18.

The example power supply 12 includes a housing 86, within which the control circuitry 32, the power conversion circuitry 30, the wire feed assembly 60, the user interface 34, and/or the gas control valving 46 are enclosed. In examples in which the power conversion circuitry 30 includes multiple power conversion circuits (e.g., a preheating power conversion circuit and a welding power conversion circuit), all of the power conversion circuits are included within the housing 86.

Figure 1B:
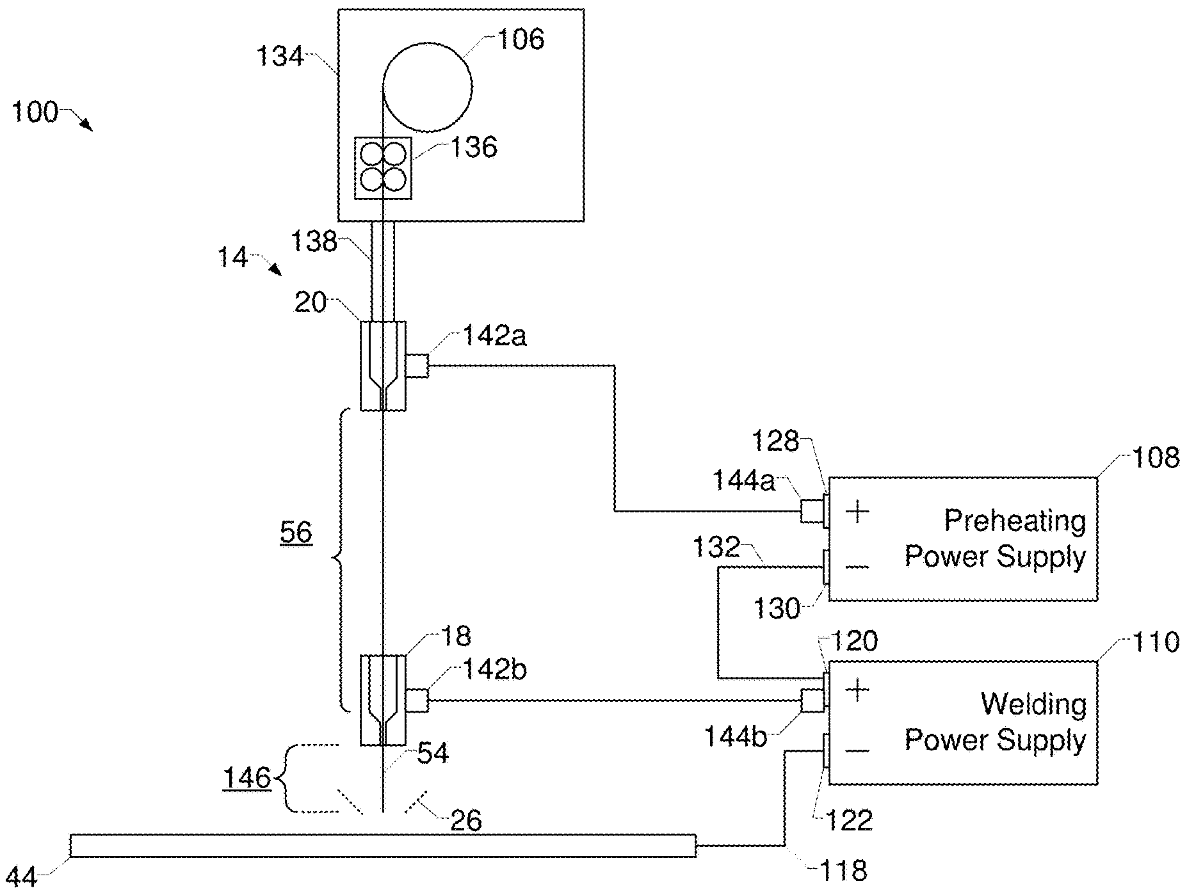
FIG. 1B illustrates another example welding system including a welding power supply configured to convert input power to welding power and a preheating power supply configured to convert input power to preheating power, in accordance with aspects of this disclosure.

FIG. 1B illustrates another example welding system 100 including a welding power supply 110 configured to convert input power to welding power and a preheating power supply 108 configured to convert input power to preheating power. The welding system 100 includes the example torch 14 having the contact tips 18, 20. The system 100 further includes the electrode wire 54 fed from a wire spool 106, a preheating power supply 108, and a welding power supply 110. The system 100 is illustrated in operation as producing the welding arc 26 between the electrode wire 54 and a workpiece 44.

In the example of FIG. 1B, the system 100 includes separate power supplies 108, 110 to provide the welding power and the preheating power to the torch 14, instead of the single power supply 12 in the example of FIG. 1A.

In operation, the electrode wire 54 passes from the wire spool 106 through the second contact tip 20 and the first contact tip 18, between which the preheating power supply 108 generates a preheating current to heat the electrode wire 54. Specifically, in the configuration shown in FIG. 1B, the preheating current enters the electrode wire 54 via the second contact tip 20 and exits via the first contact tip 18. The example preheating power supply 108 may implement a controlled voltage control loop or a controlled current control loop to control the voltage and/or current output to the preheating circuit.

At the first contact tip 18, a welding current may also enter the electrode wire 114. The welding current is generated, or otherwise provided by, the welding power supply 110. The welding current flows between the electrode wire 54 and the workpiece 44, which in turn generates the welding arc 26. When the electrode wire 54 makes contact with a target metal workpiece 44, or when an arc exists between the electrode wire 54 and the workpiece 44, an electrical circuit is completed and the welding current flows through the electrode wire 54, across the arc 26, across the metal work piece(s) 44, and returns to the welding power supply 110. The welding current causes the electrode wire 54 and the parent metal of the work piece(s) 44 to melt, thereby joining the work pieces as the melt solidifies. By preheating the electrode wire 54, a welding arc 26 may be generated with drastically reduced arc energy. Generally speaking, the preheating current is proportional to the distance between the contact tips 18, 20 and the electrode wire 54 size.

The welding current is generated, or otherwise provided by, a welding power supply 110, while the preheating current is generated, or otherwise provided by, the preheating power supply 108. The preheating power supply 108 and the welding power supply 110 may ultimately share a common power source (e.g., a common generator or line current connection), but the current from the common power source is converted, inverted, and/or regulated to yield the two separate currents—the preheating current and the welding current. For instance, the preheat operation may be facilitated with a single power source and associated converter circuitry, in which case three leads may extend from a single power source.

During operation, the system 100 establishes a welding circuit to conduct welding current from the welding power supply 110 to the first contact tip 18, and returns to the power supply 110 via the welding arc 26, the workpiece 44, and a work lead 118. To enable connection between the welding power supply 110 and the first contact tip 18 and the workpiece 44, the welding power supply 110 includes terminals 120, 122 (e.g., a positive terminal and a negative terminal).

During operation, the preheating power supply establishes a preheating circuit to conduct preheating current through a section 56 of the electrode wire 54. To enable connection between the preheating power supply 108 and the contact tips 18, 20, the preheating power supply 108 includes terminals 128, 130. The preheating current flows from the preheating power supply 108 to the second contact tip 20, the section 56 of the electrode wire 54, the first contact tip 18, and returns to the preheating power supply 108 via a cable 132 connecting the terminal 120 of the welding power supply 110 to the terminal 130 of the preheating power supply 108.

Because the preheating current path is superimposed with the welding current path over the connection between the first contact tip 18 and the power supplies 108, 110, the cable 132 may enable a more cost-effective single connection between the first contact tip 18 and the power supplies 108, 110 (e.g., a single cable) than providing separate connections for the welding current to the first contact tip 18 and for the preheating current to the first contact tip 18. In other examples, the terminal 130 of the preheating power supply 108 is connected to the first contact tip 18 via a separate path than the path between the first contact tip 18 and the welding power supply 110.

As illustrated in FIG. 1B, the example system 100 includes a wire feeder 134 that feeds the electrode wire 54 to the torch 14 using a wire drive 136. The electrode wire 54 exits the wire feeder 134 and travels through a wire liner 138.

Either of the example systems 10, 100 of FIGS. 1A and/or 1B may include voltage sensors 142*a*, 142*b* to measure voltage(s) in the preheating and/or welding circuits, and/or current sensors 144*a*, 144*b* to measure current(s) in the preheating and/or welding circuits. For example, the voltage sensor 142*a* may measure the voltage at the contact tip 20 with respect to the contact tip 18, with respect to the workpiece 44, and/or any other point. Similarly, the voltage sensor 142*a* may measure the voltage at the contact tip 18 with respect to the contact tip 20, with respect to the workpiece 44, and/or any other point. The current sensor 144*a* measures preheating current, and the current sensor 144*b* measures welding current (e.g., arc current).

Figure 2:
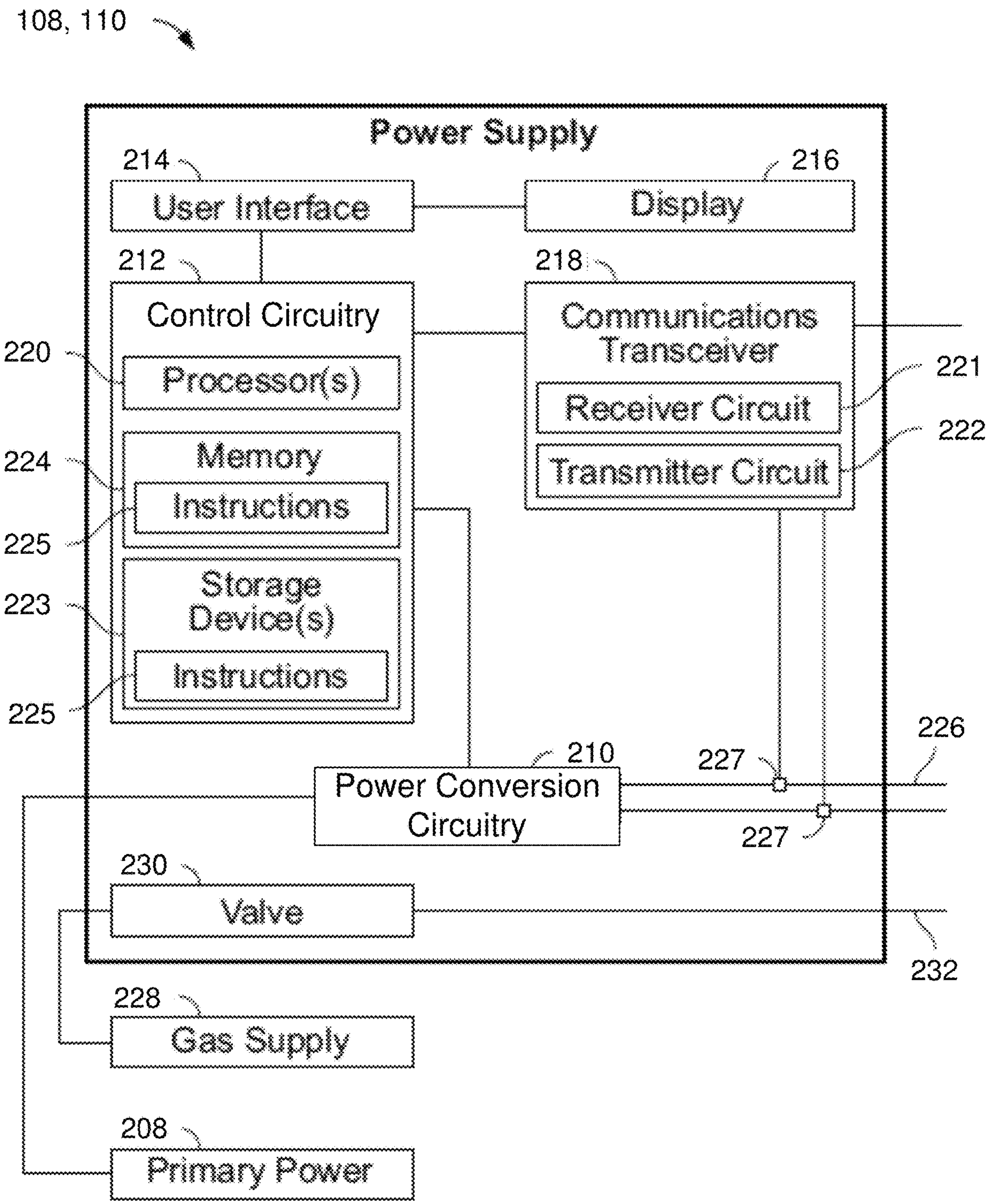
FIG. 2 is a block diagram of an example implementation of the power supplies of FIG. 1B.

FIG. 2 is a block diagram of an example implementation of the power supplies 108, 110 of FIG. 1B. The example power supply 108, 110 powers, controls, and supplies consumables to a welding application. In some examples, the power supply 108, 110 directly supplies input power to the welding torch 14. In the illustrated example, the power supply 108, 110 is configured to supply power to welding operations and/or preheating operations. The example power supply 108, 110 also provides power to a wire feeder to supply the electrode wire 54 to the welding torch 14 for various welding applications (e.g., GMAW welding, flux core arc welding (FCAW), SAW).

The power supply 108, 110 receives primary power 208 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 208 may be supplied from an offsite location (e.g., the primary power may originate from the power grid). The power supply 108, 110 includes a power conversion circuitry 210, which may include transformers, rectifiers, switches, and so forth, capable of converting the AC input power to AC and/or DC output power as dictated by the demands of the system (e.g., particular welding processes and regimes). The power conversion circuitry 210 converts input power (e.g., the primary power 208) to welding-type power based on a weld voltage setpoint and outputs the welding-type power via a weld circuit.

In some examples, the power conversion circuitry 210 is configured to convert the primary power 208 to both welding-type power and auxiliary power outputs. However, in other examples, the power conversion circuitry 210 is adapted to convert primary power only to a weld power output, and a separate auxiliary converter is provided to convert primary power to auxiliary power. In some other examples, the power supply 108, 110 receives a converted auxiliary power output directly from a wall outlet. Any suitable power conversion system or mechanism may be employed by the power supply 108, 110 to generate and supply both weld and auxiliary power.

The power supply 108, 110 includes a control circuitry 212 to control the operation of the power supply 108, 110. The power supply 108, 110 also includes a user interface 214. The control circuitry 212 receives input from the user interface 214, through which a user may choose a process and/or input desired parameters (e.g., voltages, currents, particular pulsed or non-pulsed welding regimes, and so forth). The user interface 214 may receive inputs using any input device, such as via a keypad, keyboard, buttons, touch screen, voice activation system, wireless device, etc. Furthermore, the control circuitry 212 controls operating parameters based on input by the user as well as based on other current operating parameters. Specifically, the user interface 214 may include a display 216 for presenting, showing, or indicating, information to an operator. The control circuitry 212 may also include interface circuitry for communicating data to other devices in the system, such as the wire feeder. For example, in some situations, the power supply 108, 110 wirelessly communicates with other welding devices within the welding system. Further, in some situations, the power supply 108, 110 communicates with other welding devices using a wired connection, such as by using a network interface controller (NIC) to communicate data via a network (e.g., ETHERNET, 10baseT, 10base100, etc.). In the example of FIG. 2, the control circuitry 212 communicates with the wire feeder via the weld circuit via a communications transceiver 218.

The control circuitry 212 includes at least one controller or processor 220 that controls the operations of the welding power supply 108, 110. The control circuitry 212 receives and processes multiple inputs associated with the performance and demands of the system. The processor 220 may include one or more microprocessors, such as one or more "general-purpose" microprocessors, one or more special-purpose microprocessors and/or ASICS, and/or any other type of processing device. For example, the processor 220 may include one or more digital signal processors (DSPs).

The example control circuitry 212 includes one or more storage device(s) 223 and one or more memory device(s) 224. The storage device(s) 223 (e.g., nonvolatile storage) may include ROM, flash memory, a hard drive, and/or any other suitable optical, magnetic, and/or solid-state storage medium, and/or a combination thereof. The storage device 223 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 224 may include a volatile memory, such as random access memory (RAM), and/or a nonvolatile memory, such as read-only memory (ROM). The memory device 224 and/or the storage device(s) 223 may store a variety of information and may be used for various purposes. For example, the memory device 224 and/or the storage device(s) 223 may store processor executable instructions 225 (e.g., firmware or software) for the processor 220 to execute. In addition, one or more control regimes for various welding processes, along with associated settings and parameters, may be stored in the storage device 223 and/or memory device 224, along with code configured to provide a specific output (e.g., initiate wire feed, enable gas flow, capture welding current data, detect short circuit parameters, determine amount of spatter) during operation.

In some examples, the welding power flows from the power conversion circuitry 210 through a weld cable 226. The example weld cable 226 is attachable and detachable from weld studs at each of the power supply 108, 110 (e.g., to enable ease of replacement of the weld cable 226 in case of wear or damage). Furthermore, in some examples, welding data is provided with the weld cable 226 such that welding power and weld data are provided and transmitted together over the weld cable 226. The communications transceiver 218 is communicatively coupled to the weld cable 226 to communicate (e.g., send/receive) data over the weld cable 226. The communications transceiver 218 may be implemented based on various types of power line communications methods and techniques. For example, the communications transceiver 218 may utilize IEEE standard P1901.2 to provide data communications over the weld cable 226. In this manner, the weld cable 226 may be utilized to provide welding power from the power supply 108, 110 to the wire feeder 134 and the welding torch 14. Additionally or alternatively, the weld cable 226 may be used to transmit and/or receive data communications to/from the wire feeder 134 and the welding torch 14. The communications transceiver 218 is communicatively coupled to the weld cable 226, for example, via cable data couplers 227, to characterize the weld cable 226, as described in more detail below. The cable data coupler 227 may be, for example, a voltage or current sensor.

In some examples, the power supply 108, 110 includes or is implemented in a wire feeder.

The example communications transceiver 218 includes a receiver circuit 221 and a transmitter circuit 222. Generally, the receiver circuit 221 receives data transmitted by the wire feeder via the weld cable 226 and the transmitter circuit 222 transmits data to the wire feeder via the weld cable 226. As described in more detail below, the communications transceiver 218 enables remote configuration of the power supply 108, 110 from the location of the wire feeder and/or compensation of weld voltages by the power supply 108, 110 using weld voltage feedback information transmitted by the wire feeder 134. In some examples, the receiver circuit 221 receives communication(s) via the weld circuit while weld current is flowing through the weld circuit (e.g., during a welding-type operation) and/or after the weld current has stopped flowing through the weld circuit (e.g., after a welding-type operation). Examples of such communications include weld voltage feedback information measured at a device that is remote from the power supply 108, 110 (e.g., the wire feeder) while the weld current is flowing through the weld circuit.

Example implementations of the communications transceiver 218 are described in U.S. Pat. No. 9,012,807. The entirety of U.S. Pat. No. 9,012,807 is incorporated herein by reference. However, other implementations of the communications transceiver 218 may be used.

The example wire feeder 134 also includes a communications transceiver, which may be similar or identical in construction and/or function as the communications transceiver 218.

In some examples, a gas supply 228 provides shielding gases, such as argon, helium, carbon dioxide, and so forth, depending upon the welding application. The shielding gas flows to a valve 230, which controls the flow of gas, and if desired, may be selected to allow for modulating or regulating the amount of gas supplied to a welding application. The valve 230 may be opened, closed, or otherwise operated by the control circuitry 212 to enable, inhibit, or control gas flow (e.g., shielding gas) through the valve 230. Shielding gas exits the valve 230 and flows through a cable 232 (which in some implementations may be packaged with the welding power output) to the wire feeder which provides the shielding gas to the welding application. In some examples, the power supply 108, 110 does not include the gas supply 228, the valve 230, and/or the cable 232.

In either of the example systems of FIGS. 1A and/or 1B, the preheating power supply (e.g., the power conversion circuitry 30, the preheating power supply 108), the welding power supply (e.g., the power conversion circuitry 30, the welding power supply 110), and/or any other device in communication with the systems may be configured to calculate instantaneous power of a process that contains multiple sources of input energy and display the calculated power via a user interface. Each of the energy sources into the process (e.g., the power conversion circuitry 30, the power supplies 108, 110) monitors an average instantaneous power by collecting samples of output voltage and output current.

While the example methods and apparatus disclosed above provide an energy source for wire preheating and an energy source for a welding arc, other example methods and apparatus may include additional and/or different sources of process energy, such as one or more lasers, additional preheated wire with corresponding preheat energy (e.g., resistively heated, inductively heated, etc.), additional arcs with corresponding arc energy, and/or any other sources of energy.

Furthermore, while the example methods and apparatus disclosed above use the processors 36, 220 of the power supplies, in some other examples, one or more external devices, such as a robot controller, a programmable logic controller (PLC), a computing system, a cloud computing system, and/or any other processing device external to the welding system, may collect the power or energy data and determine the total power or energy input to the process.

Figure 3:
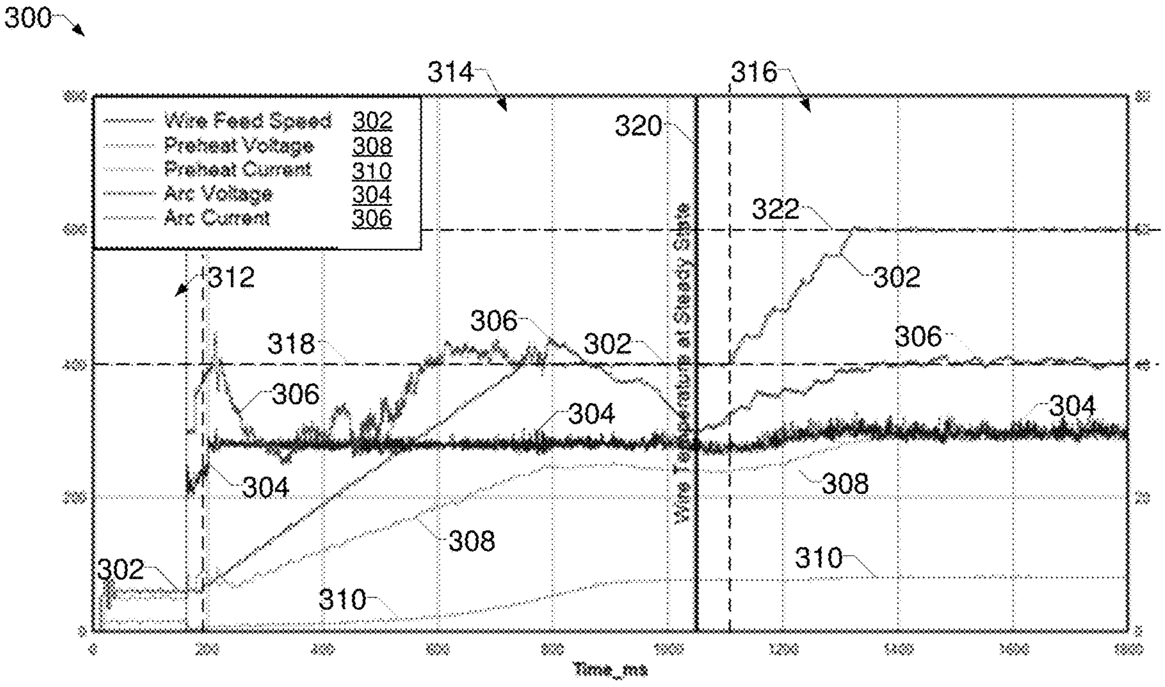
FIG. 3 is a graph illustrating wire feed speed, welding voltage, welding current, preheating voltage, and preheating current during an example arc starting procedure that may be implemented by the example systems of FIGS. 1A and/or 1B to start a welding operation.

The example systems of FIGS. 1A, 1B, and 2 provide a more stable arc starting process by controlling the wire feed speed to stabilize a wire temperature profile during the arc starting process. FIG. 3 is a graph 300 illustrating wire feed speed 302, welding voltage 304, welding current 306, preheating voltage 308, and preheating current 310 during an example arc starting procedure that may be implemented by the example systems of FIGS. 1A, 1B, and/or 2 to start a welding operation.

Figure 4:
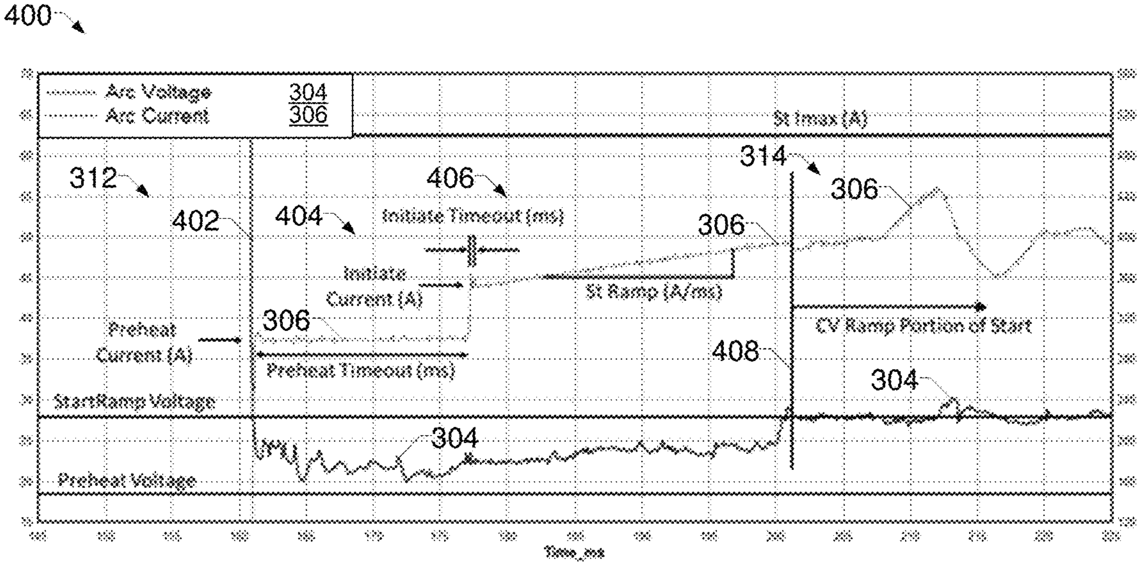
FIG. 4 is a graph illustrating welding voltage and welding current during a first portion of the example arc starting procedure of FIG. 3.

In the example graph 300, the arc starting process includes an arc initiation phase 312, a stabilization phase 314, and a steady state phase 316. During the arc initiation phase 312, the welding power supply 12, 110 (e.g., via the power conversion circuitry 30 of FIG. 1A and/or the power conversion circuitry 210 of FIG. 2) initiates the arc at a low wire feed speed, and increases the arc length of the welding arc to a target length. FIG. 4 is a more detailed graph 400 illustrating the welding voltage 304 and welding current 306 during the arc initiation phase 312 of the example arc starting procedure of FIG. 3.

As shown in FIG. 4, the welding voltage 304 decreases from an open circuit voltage to an arc voltage at time 402, at which time the arc is first ignited. Following arc ignition at time 402, the welding power supply 12, 110 (e.g., via the power conversion circuitry 30 of FIG. 1A and/or the power conversion circuitry 210 of FIG. 2) controls the current to be at a first level to heat a stickout portion 146 of the wire 54 (e.g., the portion of the wire 54 in FIG. 1A or 1B at any given time that is located between the welding contact tip 18 and either the arc 26 or the workpiece 44). The welding power supply 12, 110 heats the stickout portion 146 for a wire heating time 404 prior to increasing the arc length.

Following the wire heating time 404, the welding power supply 12, 110 increases the arc current at a predetermined ramp rate over a time period 406 to increase the arc length to a desired arc length. At time 408 (e.g., an end of the arc initiation phase 312), the welding power supply 12, 110 (e.g., via the control circuitry 32, 212) changes to a voltage-controlled control mode and enters the stabilization phase 314.

The starting approach illustrated in FIG. 4 limits the energy applied to the wire 54 during the arc initiation phase 312 of the wire feed speed ramp, thereby limiting the occurrence of ejecting a section or chunk of unmelted wire during the arc starting transient, while permitting successful ignition of the arc. Limiting the energy applied to the wire 54 reduces or aids in preventing excessive heating of a hot spot formed on the wire 54 at the interface between the wire and the weld contact tip 18 during the initial short circuit.

Returning to FIG. 3, when the arc initiation phase 312 ends, the welding power supply changes to a voltage-controlled mode of controlling the welding current 306. During the stabilization phase 314, the wire feeder (e.g., the wire feed assembly 60, the wire feeder 134) accelerates (e.g., ramps up) the wire feed speed 302 from the low wire feed speed in the arc initiation phase 312 to an intermediate wire feed speed 318. The intermediate rate 318 may be a constant, predetermined wire feed speed, or may be computed based on one or more factors such as wire size, wire type, and/or preheating.

While the wire feeder 60, 134 supplies the wire 54 at the intermediate rate 318, until the wire 54 has reached a stable temperature profile. In the illustrated example, stabilization of the wire temperature profile involves reduction of the temperature gradients in the welding wire to less than a threshold gradient. In other words, wire temperature stabilization may be said to have occurred in the example of FIG. 3 when the difference in temperature in the stickout portion 146 of the wire has reached essentially a steady state that is maintained throughout the duration of the weld (absent changes to the welding current).

The example welding power supply 12, 110 (e.g., via the control circuitry 32, 212 and the current sensor 144*b*) monitors the welding current 306 to identify wire temperature stabilization. In the example of FIG. 3, the welding power supply 12, 110 identifies wire temperature stabilization in response to identifying a local minimum in the welding current 306 (e.g., at time 320).

Additionally or alternatively, the welding power supply 12, 110 may determine that the wire temperature profile has stabilized when the wire feeder 60, 134 has supplied the wire 54 at the intermediate rate 318 for at least a threshold time period.

After identifying the stabilization of the wire temperature profile, the wire feeder 60, 134 accelerates the wire feed speed 302 to the user-selected target wire feed speed 322 from the intermediate rate 318, and the arc starting operation ends. The welding power supply 12, 110 then controls the welding parameters and/or wire feed speed in accordance with the user-selected parameters.

Figure 5:
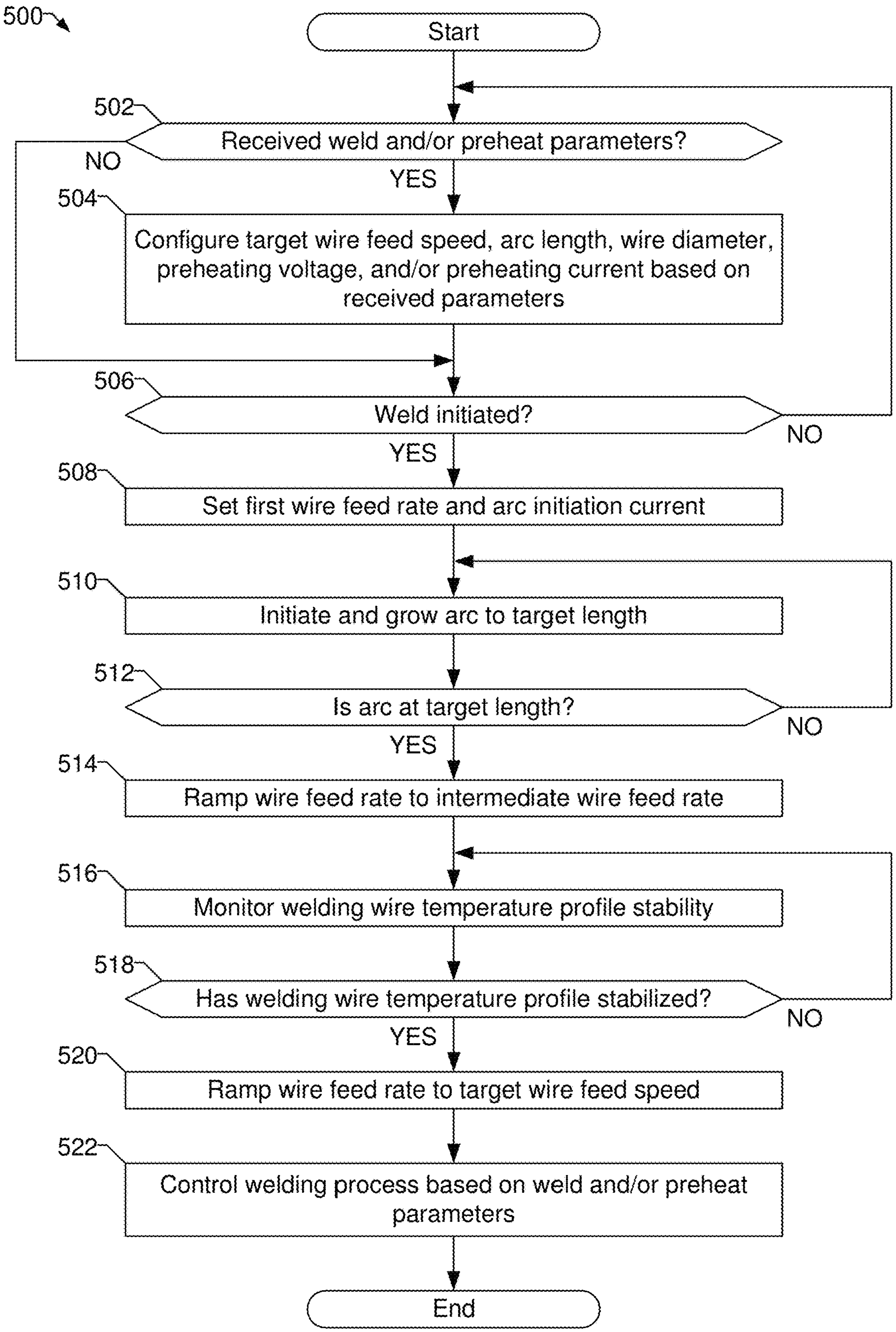
FIG. 5 is a flowchart representative of example machine readable instructions which may be executed by the example power supplies of FIGS. 1A, 1B, and/or 2, to start a welding operation.

FIG. 5 is a flowchart representative of example machine readable instructions 500 which may be executed by the example power supplies of FIGS. 1A, 1B, and/or 2, to start a welding operation. The example instructions 500 are described below with reference to the example system 100 and power supply 110 of FIGS. 1B and 2. However, the instructions 500 may be performed by other power supplies, including or omitting the wire preheating circuit.

At block 502, the control circuitry 212 (e.g., the processor (s) 220) determines whether weld parameters and/or preheat parameters have been received (block 502). For example, a user, robotic control system, and/or any other person or system, may specify one or more weld parameters and/or preheat parameters via the user interface 214 and/or the communications transceiver 218. Example parameters may include target wire feed speed, an arc length, a wire diameter, a preheating voltage, and/or preheating current. If weld parameters and/or preheat parameters have been received (block 502), at block 504 the control circuitry 212 configures a target wire feed speed, an arc length, a wire diameter, a preheating voltage, and/or preheating current based on the received parameters.

After configuring the parameters (block 504), or if weld parameters and/or preheat parameters have not been received (block 502), at block 506 the control circuitry 212 determines whether a weld has been initiated. For example, the control circuitry 212 may determine whether a trigger signal has been received from a robotic welding system or a weld torch. If a weld has not been initiated (block 506), control returns to block 502 for parameter configuration.

If a weld has been initiated (block 506), at block 508 the control circuitry 212 sets a first wire feed rate and an arc initiation current. For example, the control circuitry 212 may set a low wire feed rate (e.g., 50-100 ipm) and a low arc initiation current (e.g., the wire heating current as illustrated in FIG. 4). At block 510, the control circuitry 212 controls the power conversion circuitry 210 to initiate and grow the arc (e.g., the wire heating time 404 and the time period 406).

At block 512, the control circuitry 212 determines whether the arc is at the target length. For example, the control circuitry 212 may measure the arc voltage (e.g., via the voltage sensor 142*b*) and/or the arc current (e.g., via the current sensor 144*b*). If the arc is not at the target length (block 512), control returns to block 510 to continue growing the arc length. When the arc reaches the target length (block 512), at block 514 the control circuitry 212 ramps the wire feed rate to an intermediate wire feed rate (e.g., the intermediate wire feed speed 318 of FIG. 3). In some examples, the intermediate wire feed rate is between 200 ipm and 600 ipm. In some such examples, the intermediate wire feed rate is between 400 ipm and 600 ipm.

At block 516, the control circuitry 212 monitors the weld wire temperature profile stability. For example, the control circuitry 212 may monitor the welding current, via the current sensor 144*b*, to detect a local minimum current. The local minimum current indicates that the wire temperature profile has stabilized. Additionally or alternatively, the control circuitry 212 may determine that the wire temperature profile has stabilized based on outputting the wire 54 at the intermediate rate 318 for at least a threshold time. The threshold time may be based on, for example, a type of the wire 54, a size or diameter of the wire 54, preheating power supplied to the wire 54 by the preheating circuit, and/or any other parameters.

At block 518, the control circuitry 212 determines whether the welding wire temperature profile has stabilized. For example, the control circuitry 212 may determine that the wire temperature profile has stabilized in response to detecting a local minimum in the welding current and/or in response to feeding the wire 54 at the intermediate rate 318 for at least a threshold time. If the welding wire temperature profile has not stabilized (block 518), control returns to block 516 to continue monitoring.

When the welding wire temperature profile has stabilized (block 518), at block 520 the control circuitry 212 controls the wire feeder 60, 134 to ramp the wire feed rate to the target wire feed speed (e.g., configured by the user or robotic system). At block 522, the arc starting process concludes and the control circuitry 212 controls the welding process based on the weld and/or preheat parameters (e.g., configured in block 504). The example instructions 500 then end.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system, comprising:
- a welding power supply configured to convert input power to welding power;
- a wire feeder configured to feed welding wire to a welding torch; and
- control circuitry configured to:
  - in response to an initiation of a welding process, control the wire feeder to feed the welding wire at a first rate while controlling the welding power supply to output the welding power to initiate a welding arc;
  - in response to initiation of the welding arc, control the wire feeder to increase a feed rate of the wire feeder from the first rate to a second rate;
  - in response to determining that a temperature profile of a heated portion of the welding wire has stabilized, control the wire feeder to change the feed rate of the wire feeder from the second rate to a target wire feed speed;
    - monitor a welding current of the welding power; and
    - determine that the temperature profile of the heated portion has stabilized in response to the welding current reaching a local minimum.

2. The welding system as defined in claim 1, wherein the second rate is based on a diameter of the welding wire.

3. The welding system as defined in claim 1, wherein the second rate is between 200 inches per minute and 600 inches per minute.

4. The welding system as defined in claim 3, wherein the second rate is between 400 inches per minute and 600 inches per minute.

5. The welding system as defined in claim 3, wherein the target wire feed speed is more than 500 inches per minute.

6. The welding system as defined in claim 5, wherein the target wire feed speed is more than 600 inches per minute.

7. The welding system as defined in claim 1, wherein the control circuitry is configured to, after initiation of the welding arc but prior to increasing the feed rate of the wire feeder from the first rate to the second rate:

control a welding current of the welding power based on a first target current; and increase the welding current from the first target current to increase an arc length of the welding arc to a target length.

8. The welding system as defined in claim 7, wherein the control circuitry is configured to change to a voltage-controlled control mode when increasing the feed rate from the first rate after increasing the welding current from the first target current.

9. The welding system as defined in claim 7, wherein the control circuitry is configured to determine that the arc length has met the target length based on a voltage of the welding power.

10. The welding system as defined in claim 1, wherein the heated portion of the welding wire is a stickout portion of the welding wire between a welding contact tip and the arc.

11. The welding system as defined in claim 1, wherein the target wire feed speed is higher than the second rate.

12. A welding system, comprising:

a welding power supply configured to convert input power to welding power;

a wire feeder configured to feed welding wire to a welding torch; and control circuitry configured to:

in response to an initiation of a welding process, control the wire feeder to feed the welding wire at a first rate while controlling the welding power supply to output the welding power to initiate a welding arc;

in response to initiation of the welding arc, control the wire feeder to increase a feed rate of the wire feeder from the first rate to a second rate;

monitor a welding current of the welding power; and in response to determining that the welding current has reached a local minimum, control the wire feeder to change the feed rate of the wire feeder from the second rate to a target wire feed speed.

13. The welding system as defined in claim 12, further comprising a preheating power supply configured to output preheating power to preheat a portion of the welding wire located prior to a stickout portion along a travel path of the welding wire.

14. The welding system as defined in claim 12, wherein the second rate is based on a diameter of the welding wire.

15. The welding system as defined in claim 12, wherein the control circuitry is configured to, after initiation of the welding arc but prior to increasing the feed rate of the wire feeder from the first rate to the second rate:

control a welding current of the welding power based on a first target current; and increase the welding current from the first target current to increase an arc length of the welding arc to a target length.

16. The welding system as defined in claim 15, wherein the control circuitry is configured to change to a voltage-controlled control mode when increasing the feed rate from the first rate after increasing the welding current from the first target current.

17. The welding system as defined in claim 15, wherein the control circuitry is configured to determine that the arc length has met the target length based on a voltage of the welding power.

18. A welding system, comprising:

a welding power supply configured to convert input power to welding power;

a wire feeder configured to feed welding wire to a welding torch; and control circuitry configured to:

in response to an initiation of a welding process, control the wire feeder to feed the welding wire at a first rate while controlling the welding power supply to output the welding power to initiate a welding arc;

in response to initiation of the welding arc, control the wire feeder to increase a feed rate of the wire feeder from the first rate to a second rate;

in response to determining that a temperature profile of a heated portion of the welding wire has stabilized, control the wire feeder to change the feed rate of the wire feeder from the second rate to a target wire feed speed; and determine that the temperature profile of the heated portion has stabilized in response to the wire feeder outputting the welding wire at the second rate for at least a threshold time.

19. The welding system as defined in claim 18, further comprising a preheating power supply configured to output preheating power to preheat a portion of the welding wire located prior to a stickout portion along a travel path of the welding wire, wherein the control circuitry is configured to set the threshold time based on the preheating power.

* * * * *